(12) United States Patent
Park et al.

(10) Patent No.: US 12,528,267 B2
(45) Date of Patent: Jan. 20, 2026

(54) SHEET HAVING CLOSED CELL LAYER

(71) Applicant: DONGSUNG CHEMICAL Co., Ltd., Busan (KR)

(72) Inventors: Sumi Park, Busan (KR); Keunmo Kim, Busan (KR)

(73) Assignee: DONGSUNG CHEMICAL CO., LTD., Busan (KR)

( * ) Notice: Subject to any disclaimer, the term of this patent is extended or adjusted under 35 U.S.C. 154(b) by 315 days.

(21) Appl. No.: 18/038,894

(22) PCT Filed: Nov. 29, 2021

(86) PCT No.: PCT/KR2021/017719
§ 371 (c)(1),
(2) Date: Aug. 11, 2023

(87) PCT Pub. No.: WO2022/114877
PCT Pub. Date: Jun. 2, 2022

(65) Prior Publication Data
US 2024/0017520 A1    Jan. 18, 2024

(30) Foreign Application Priority Data

Nov. 27, 2020 (KR) .................. 10-2020-0163039
Nov. 26, 2021 (KR) .................. 10-2021-0165530

(51) Int. Cl.
*B32B 3/28* (2006.01)
*B32B 27/08* (2006.01)
(Continued)

(52) U.S. Cl.
CPC ............... *B32B 3/28* (2013.01); *B32B 27/08* (2013.01); *B32B 27/18* (2013.01); *B32B 27/36* (2013.01); *C08J 5/121* (2013.01); *C08J 7/0427* (2020.01); *C08L 67/02* (2013.01); *B32B 2250/244* (2013.01); *B32B 2255/10* (2013.01);
(Continued)

(58) Field of Classification Search
CPC ......................................................... B32B 3/28
See application file for complete search history.

(56) References Cited

FOREIGN PATENT DOCUMENTS

| JP | 2001-145968 A | 5/2001 |
| JP | 3111029 U | 7/2005 |

(Continued)

OTHER PUBLICATIONS

JP 2011-025979 Machine Translation (Year: 2011).*
Office Action dated Dec. 1, 2023 issued in Korean Patent Application No. 10-2021-0165530, 14 pages.

*Primary Examiner* — Zachary M Davis
(74) *Attorney, Agent, or Firm* — Scully, Scott, Murphy & Presser, P.C.

(57) ABSTRACT

The present invention relates to a sheet having a closed cell layer and, in particular, to an eco-friendly sheet including a plurality of closed cells formed on an eco-friendly resin film, and a print portion on which a predetermined image is printed. The sheet according to the present invention may be prevented from deforming or breaking even from external shocks or severe external environmental conditions, may improve the shape retention of closed cells, the elastic retention of closed cells, and the shape durability of the sheet, may be distinguished due to printing of a specific image, and may have environment-friendly advantages.

9 Claims, 6 Drawing Sheets

(51) Int. Cl.
*B32B 27/18* (2006.01)
*B32B 27/36* (2006.01)
*C08J 5/12* (2006.01)
*C08J 7/04* (2020.01)
*C08L 67/02* (2006.01)

(52) U.S. Cl.
CPC ... *B32B 2270/00* (2013.01); *B32B 2307/4023* (2013.01); *B32B 2307/56* (2013.01); *B32B 2307/7163* (2013.01); *C08J 2367/02* (2013.01); *C08J 2467/04* (2013.01); *C08L 2201/06* (2013.01); *C08L 2203/16* (2013.01); *C08L 2205/025* (2013.01)

(56) References Cited

FOREIGN PATENT DOCUMENTS

| | | |
|---|---|---|
| JP | 2005212242 A | 8/2005 |
| JP | 2011025979 A | 2/2011 |
| KR | 101614069 B1 | 4/2016 |
| KR | 20180003979 A | 1/2018 |

\* cited by examiner

SHEET HAVING CLOSED CELL LAYER

CROSS-REFERENCE TO RELATED APPLICATION

This application claims priority under 35 U.S.C. § 119 to Korean Patent Application Nos. 10-2020-0163039, filed on Nov. 27, 2020, and 10-2021-0165530, filed on Nov. 26, 2021, in the Korean Intellectual Property Office (KIPO), the disclosure of which is incorporated by reference herein in its entirety.

TECHNICAL FIELD

The present invention relates to an eco-friendly sheet having a closed cell layer.

BACKGROUND ART

Conventional sheets consist of two plastic sheet layers stacked (e.g., laminated) together to form a so-called bubble plastic material. This bubble shape is vacuum-formed onto a single sheet, which is substantially stacked to a flat sheet to form a sealed bubble between the two layers. The bubble generally has a circular or cylindrical shape, and other shapes such as hexagonal-, diamond-, and partially spherical-shaped bubbles are also known.

For example, U.S. Pat. No. 4,869,939 discloses an air bubble cell sheet including a cell arrangement in which adjacent cells have a mutually flowable structure through an intermediate passage. In addition, Japanese Patent Publication No. 2003-2377842 discloses a sheet having air cells connected in groups by intermediate connecting passages.

However, the aforementioned sheets are unsatisfactory in preventing deformation and/or breakage caused by external shock or harsh external environmental conditions and are also insufficient in terms of maintaining the shape of the air cell and durability. In addition, the use of general plastic materials may adversely affect the environment and has limitations in terms of identifiability (e.g., discrimination).

DETAILED DESCRIPTION OF THE INVENTION

Technical Objectives

The present invention is directed to a sheet having a closed cell layer which may prevent deformation or breakage under external shocks or harsh external environmental conditions, improve the shape retention of the closed cell, the elasticity retention of the closed cell, and the shape durability of the sheet, achieve identifiability by printing a specific image, and have eco-friendliness.

Other objectives and advantages of the present invention may be more clearly described by the following detailed description and claims.

Technical Means to Solve the Problem

To achieve the above objectives, the present invention provides a sheet having a closed cell layer including a first resin film layer; a cell layer formed on one surface of the first resin film layer and including a plurality of closed cells spaced apart from each other at predetermined intervals; and a print portion formed on at least one surface of the first resin film layer and having a predetermined color or pattern, wherein the closed cells are filled with a predetermined amount of air, and a ratio of a maximum height ($H_{max}$) and a minimum height ($H_{min}$) of the closed cells filled with air is in a range of 1:0.6 to 0.95.

In an embodiment of the present invention, an internal air density of the closed cells may be in a range of 0.001 to 0.5 g/cm3.

In an embodiment of the present invention, the sheet may not crack when an iron ball weighing 5 kg freely falls from a height of 60 cm on the sheet having the closed cell layer disposed on a glass plate.

In an embodiment of the present invention, at least one of the first resin film layer and the cell layer may include a biodegradable polymer.

In an embodiment of the present invention, the biodegradable polymer may include at least one or more selected from starch, cellulose, chitin, PLA (polylactide), PHA (polyhydroxyalkanoates), PCL (poly ε-caprolactone), PBAT (Polybutylene adipate terephthalate), PGA (polyglycolacid), AP (aliphaticpolyester), PHBV (poly(3-hydroxybutyrate-co-3-hydroxy valerate)), and PBS (polybutylene succinate).

In an embodiment of the present invention, the cell layer may include: a bonded portion in which one surface of a second resin film layer is laminated and fused on one surface of the first resin film layer; and a non-bonded portion in which the first resin film layer and the second resin film layer are not fused and air-sealed closed cells are formed between the first resin film layer and the second resin film layer.

In an embodiment of the present invention, the cell layer may include a predetermined embossed pattern formed by repeatedly arranging the plurality of closed cells.

In an embodiment of the present invention, a horizontal cross-sectional shape of the embossed pattern may be selected from a circular shape, a semicircular shape, a fan shape, and a polygonal shape.

In an embodiment of the present invention, the print portion may be formed: on another surface of the first resin film layer, on one surface of the first resin film layer in contact with the cell layer, or on both of the another surface and one surface of the first resin film layer.

In an embodiment of the present invention, the print portion may be formed by stacking a printing layer printed with a predetermined color or pattern on another surface of the first resin film layer.

In an embodiment of the present invention, the print portion may include at least one or more biodegradable polymers selected from starch, cellulose, chitin, PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate) and combinations thereof.

Effects of the Invention

A sheet having a closed cell layer according to an embodiment of the present invention may prevent deformation or breakage under external shocks or harsh external environmental conditions, improve the shape retention of the closed cell, the elasticity retention of the closed cell, and the shape durability of the sheet, achieve identifiability by printing a specific image, and have eco-friendliness.

Effects according to the present invention are not limited by the description exemplified above, and more diverse effects are included in the present specification.

BRIEF DESCRIPTION OF THE INVENTION

Figure 3:
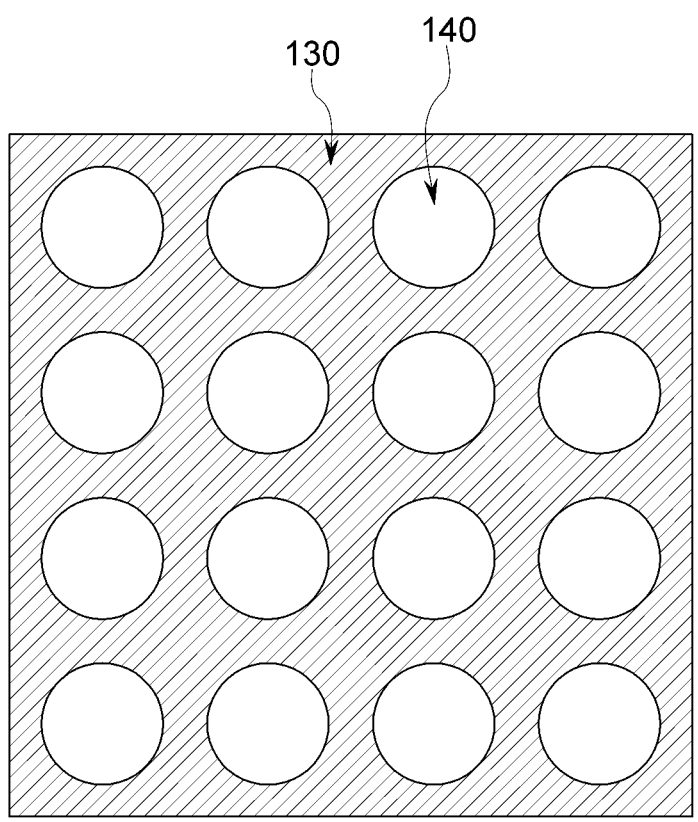
Figure 4:
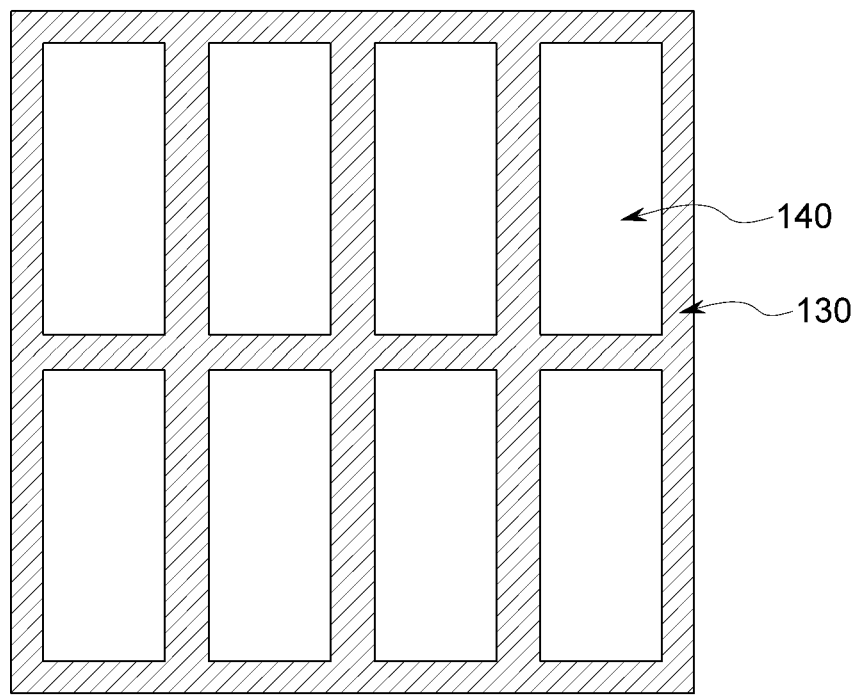

FIGS. 3 and 4 are schematic plan views illustrating various embodiments of a bonded portion 130 and a non-bonded portion 140 provided in a sheet having a closed cell layer according to the present invention.

Figure 5:
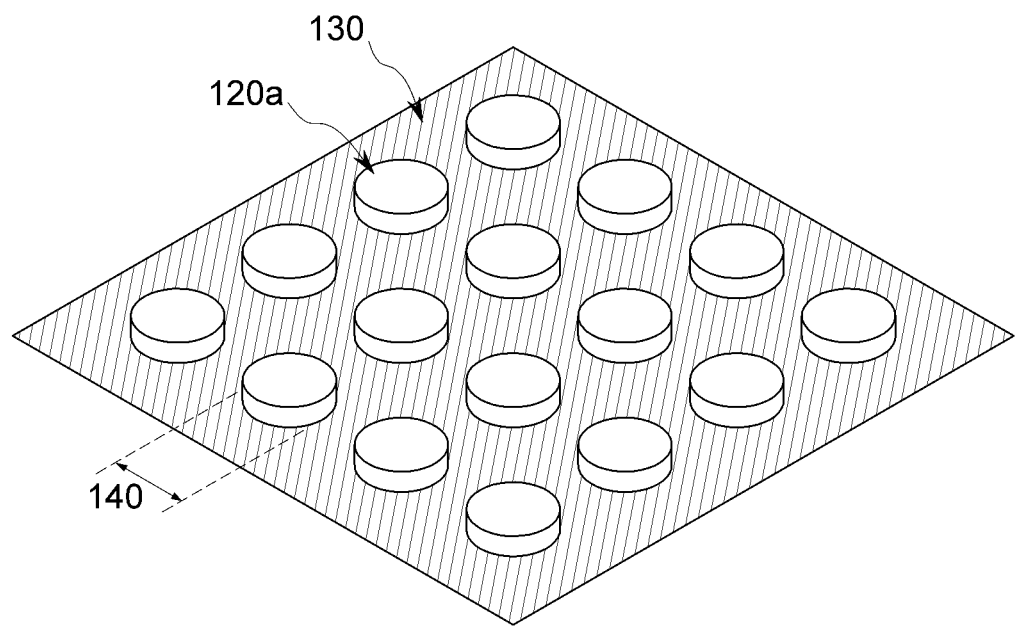
Figure 6:
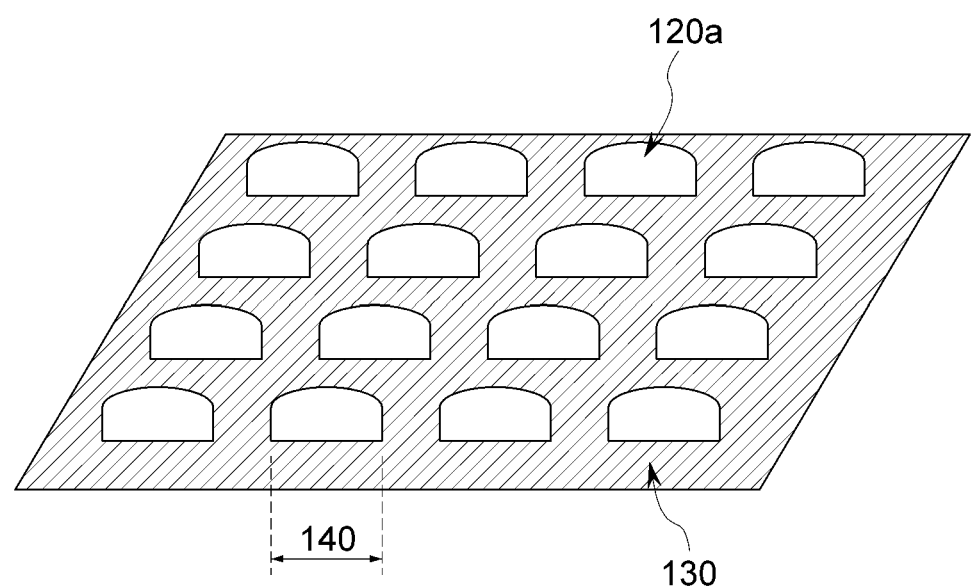
Figure 7:
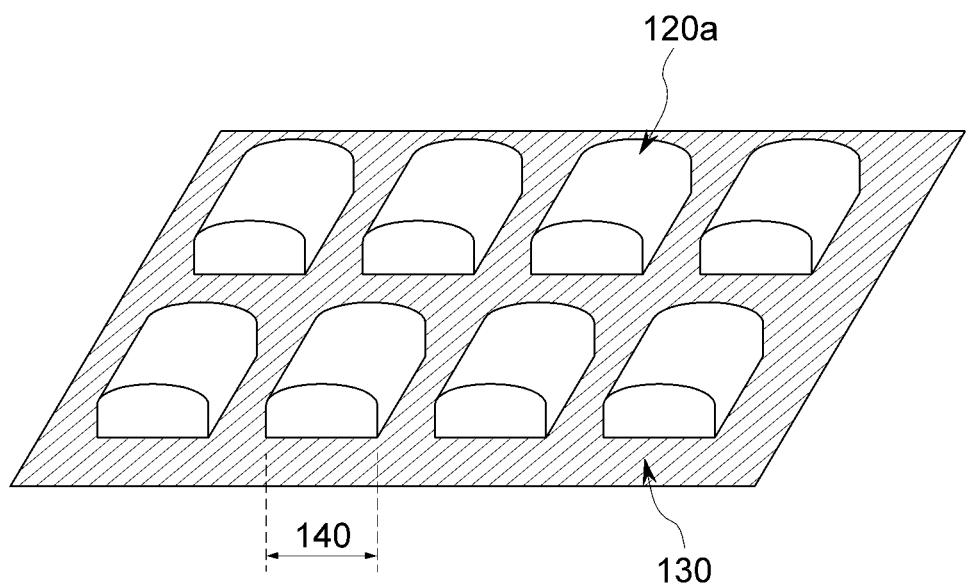

FIGS. 5 to 7 are perspective views illustrating various embodiments of a bonded portion 130 and a non-bonded portion 140 provided in a sheet having a closed cell layer according to the present invention.

Figure 8:
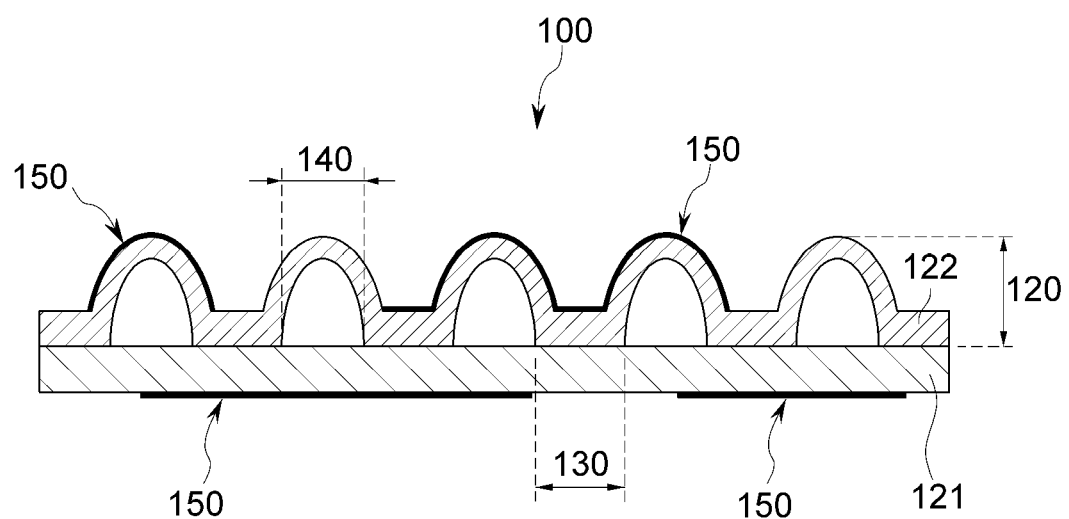
Figure 9:
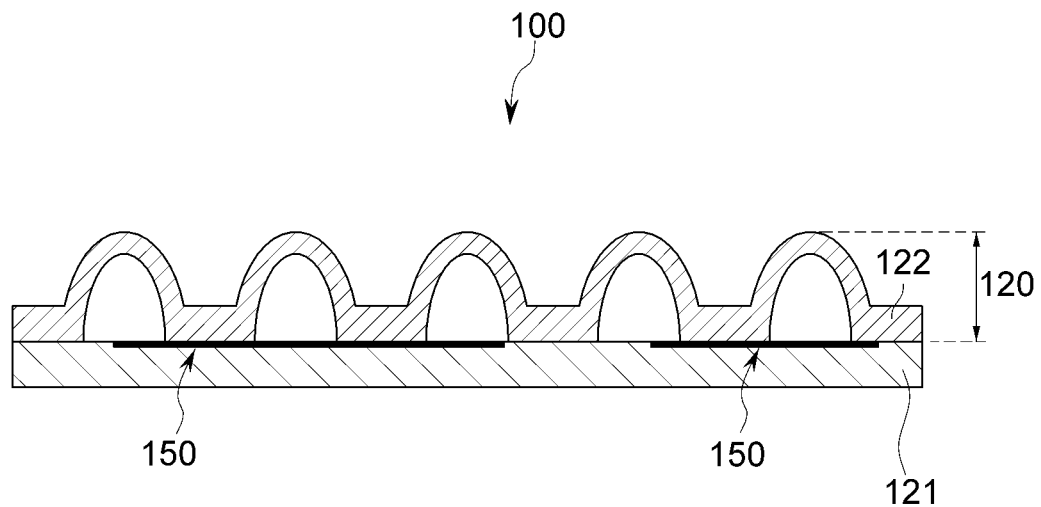
Figure 10:
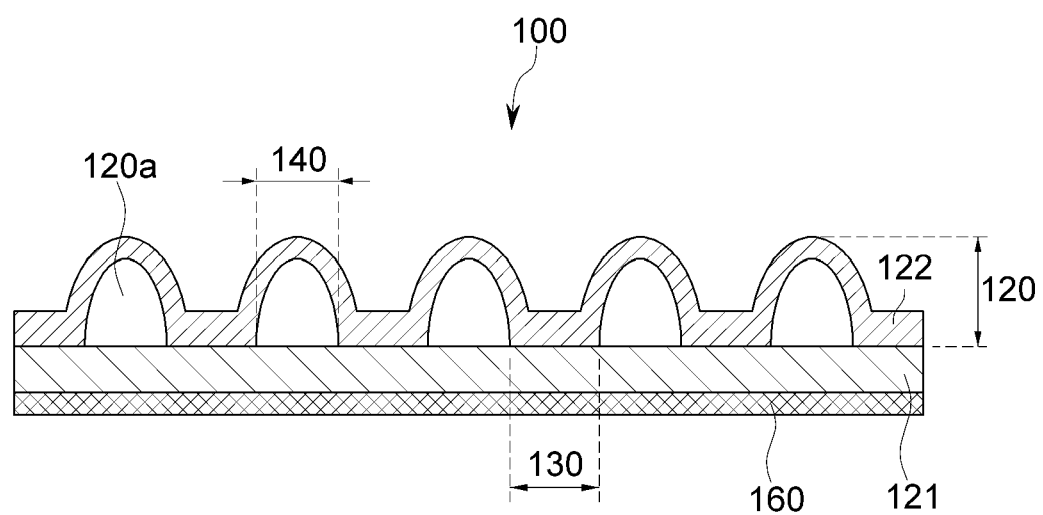

FIGS. 8 to 10 are cross-sectional views illustrating various embodiments of a print portion provided in a sheet having a closed cell layer according to the present invention.

REFERENCE NUMERALS

100: sheet having closed cell layer
120: closed cell layer
120a: closed cell
121: first resin film layer
122: second resin film layer
130: bonded portion
140: non-bonded portion
150: print portion
160: printing layer

MODES FOR CARRYING OUT THE INVENTION

Hereinafter, the configuration and operation of a preferred embodiment of the present invention will be described in detail with reference to the accompanying drawings.

Here, in assigning reference numerals to the components of each drawing, it should be noted that the same components are marked with the same numerals as much as possible, even if they are displayed on different drawings.

For embodiments of the present invention disclosed in the description, specific structural or functional descriptions are only exemplified for the purpose of explaining the embodiments of the present invention, and the embodiments of the present invention may be implemented in various forms, and it should not be construed as being limited to the embodiments described in the description.

Since the present invention may have various modifications and various forms, specific embodiments are illustrated in the drawings and described in the description. However, this is not intended to limit the present invention to a specific form disclosed, and should be understood to include all modifications, equivalents, and substitutes included in the spirit and scope of the present invention. Like reference numerals have been used for like components in describing each figure.

In this specification, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present invention.

Throughout the specification, when a certain portion is said to "include" a certain component, it means that it may further include other components, not excluding other components, unless otherwise stated. In addition, throughout the specification, "above" or "on" means not only the case of being located above or below the target part, but also the case having another part located in the middle thereof, and it does not mean that it is necessarily located at an upper portion with respect to the direction of gravity. Throughout the specification of the present application, when referring to "planar", it means that the target part is viewed from above, and when referring to "cross-section", it means that the cross-section of the target part cut vertically is viewed from the side.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in the present application, they should not be interpreted in an ideal or excessively formal meaning.

Hereinafter, preferred embodiments of the present invention will be described in more detail with reference to the accompanying drawings. The same reference numerals are used for the same components in the drawings, and redundant descriptions of the same components are omitted.

Figure 1:
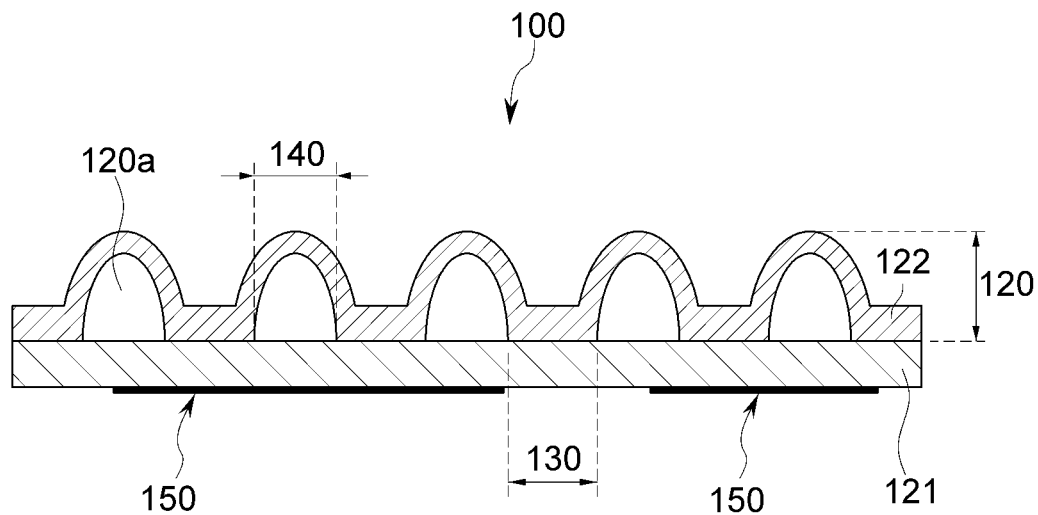
FIG. 1 is a cross-sectional view illustrating a sheet having a closed cell layer according to an embodiment of the present invention.

FIG. 1 is a cross-sectional structural view schematically illustrating a sheet having a closed cell layer according to an embodiment of the present invention.

Referring to FIG. 1, a sheet 100 having a closed cell layer according to an embodiment of the present invention includes a first resin film layer 121; a cell layer 120 formed on one surface of the first resin film layer 121 and including a plurality of closed cells 120a spaced apart from each other at predetermined intervals; and a print portion 150 formed on at least one surface of the first resin film layer 121 and having a predetermined color or pattern, where the closed cells 120a are filled with a certain amount of air so that it may have a height change rate according to pressure application within a predetermined range.

As such, the sealed closed cell 120a may be differentiated from conventional sheets in that a height change rate of the closed cell 120a according to the application of pressure may be controlled and an internal air density may be adjusted to a specific range, and accordingly, the elasticity of the closed cell 120a and the shape durability of the sheet may be continuously maintained and improved although a certain pressure is applied from the outside.

The first resin film layer 121 and/or the cell layer 120 may be formed of a biodegradable polymer to exhibit eco-friendliness compared to conventional sheets and may include a print portion 150 to enhance readability and identifiability.

Hereinafter, each configuration of the sheet 100 having the closed cell layer will be described in detail.

First Resin Film Layer

In the sheet 100 having the closed cell layer according to the present invention, the first resin film layer 121 serves to support and protect the plurality of closed cells 120a. It may be also used as a coating substrate or a substrate film for forming the print portion 150 to be described below.

The first resin film layer 121 is not particularly limited, and plastic films commonly known in the art may be used without limitation. In consideration of eco-friendliness, the first resin film layer 121 may preferably include a common biodegradable polymer known in the art.

In the present invention, the biodegradable polymer is a polymer whose chemical structure may significantly change under environmental conditions such as light, heat and moisture, and the material change may be measured, and it is a concept involving, for example, a disintegrable polymer and a biodegradable polymer. Specifically, biodegradable polymers (or biodegradable plastics) are plastics 100% of which are naturally degraded when buried in soil, so unlike conventional hydrophobic plastics, they are environmentally friendly because there is no environmental load due to landfilling. The degree of biodegradability of these biodegradable polymers is not particularly limited. In one example, the biodegradability may be 80% or more, and may be specifically in a range from 80 to 100%. Here, the biodegradability may be based on the KS M ISO 14855-1 standard.

In general, biodegradable polymers may be classified into natural polymers, synthetic polymers, microorganism-produced polymers, and blends of natural polymers and synthetic polymers. Non-limiting examples of applicable natural high-molecular biodegradable polymers may include starch extracted from grains (e.g., crops), chitin obtained from crab or shrimp shells, cellulose, or combinations thereof. These natural polymer-based biodegradable polymers are inferior in terms of processability compared to synthetic biodegradable polymers, but are relatively inexpensive. In particular, starch is inexpensive and may use various modification technologies that may improve processability.

Non-limiting examples of synthetic biodegradable polymers by chemical synthesis may include PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate), or a combination thereof. These synthetic biodegradable polymers are relatively easy to produce and easy to control physical properties to impart various functions.

The aforementioned natural and synthetic biodegradable polymers may be mixed. In this case, it is possible to improve biodegradability and reduce costs by blending starch which has excellent biodegradability with synthetic polymers. For example, starch with PLA, starch with PCL, and starch with aliphatic polyester and the like may be mixed, and a mixing ratio thereof may be appropriately adjusted. For example, when the first resin film layer 121 is made of a mixture of PLA (polylactide) and PBAT (polybutylene adipate terephthalate), it may improve durability and thermal mechanical properties, while maintaining biodegradability of the sheet.

A thickness of the first resin film layer 121 is not particularly limited and may be appropriately adjusted within a general thickness range used in the art.

Cell Layer

In the sheet 100 having the closed cell layer according to the present invention, the cell layer 120 is formed on one surface of the first resin film layer 121 and includes the plurality of closed cells 120a spaced apart from each other at predetermined intervals.

In a specific example, the cell layer 120 may include a bonded portion 130 formed by bonding (e.g., laminating) at least a portion of a surface of the first resin film layer 121 and at least a portion of a surface of the second resin film layer 122 disposed opposite to each other, and a non-bonded portion 140 in which they 121 and 122 are partially unbonded and separated from each other. More specifically, the bonded portion 130 may refer to a flat portion in which one surface of the second resin film layer 122 is bonded (e.g., laminated) to one surface of the first resin film layer 121 to make close contact. The non-bonded portion 140 may refer to a convex portion in which the first resin film layer 121 and the second resin film layer 122 are partially non-fused and an internal space between them is filled with a predetermined air. The closed cell 120a the inside of which is sealed with a predetermined air is formed in the non-bonded portion 140.

The second resin film layer 122 constituting the cell layer 120 may use a plastic film commonly known in the art without limitation, and specifically, it is preferable to use a biodegradable polymer that is substantially the same as or different from a material forming the first resin film layer 121 described above.

In a specific example, the second resin film layers 122 may include a material the same as or different from the material of the first resin film layer, each independently including at least one selected from starch, cellulose, chitin, PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate) and combinations thereof. For a preferred example, the second resin film layer 122 is made of a mixture of PLA (polylactide) and PBAT (polybutylene adipate terephthalate), thereby having advantageous of improved durability and thermal mechanical properties, while maintaining biodegradability of the sheet.

The bonded portion 130, which is a flat portion, and the non-bonded portion 140, which is a convex portion, are alternately and repeatedly arranged, while being spaced apart from each other at certain intervals. This is preferable because the shape of the bonded portion 130 and the non-bonded 140 may be continuously maintained under external shock or harsh external environmental conditions.

The non-bonded portion 140 has the closed cell 120a having a predetermined pattern shape sealed with air. The non-bonded portion 140 may be prepared according to a conventional method known in the art. As an example, when bonding the first resin film layer 121 and the second resin film layer 122, part of contact portions of the two layers 121 and 122 are made not to contact each other, an air is then injected into a space between the non-contact portions, and the contact portions of the first resin film layer 121 and the second resin film layer 122 surrounding the air injected portion are sealed through bonding and/or fusion. In such a case, the method of sealing the air is not particularly limited.

It is preferable to adjust an internal air density of the air-sealed closed cell 120a within a predetermined range in consideration of elasticity retention and shape durability improvement. For example, the air density may be in a range from to 0.5 g/cm$^3$ and specifically, it may be implemented according to the area, shape and/or pattern of the non-bonded portion 140 within a range from 0.001 to 0.4 g/cm$^3$, 0.005 to 0.4 g/cm$^3$, 0.01 to 0.4 g/cm$^3$, 0.05 to 0.3 g/cm$^3$, and 0.05 to 0.2 g/cm$^3$. The air density may be measured using a conventional gas density measurement method, and for example, it may be carried out under conditions of 1 atm and 15° C. The sheet 100 of the present invention having the closed cells 120a sealed with air that satisfies the aforementioned air density has an advantage of maintaining elasticity of the closed cells 120a and improving shape durability of the sheet.

Figure 2:
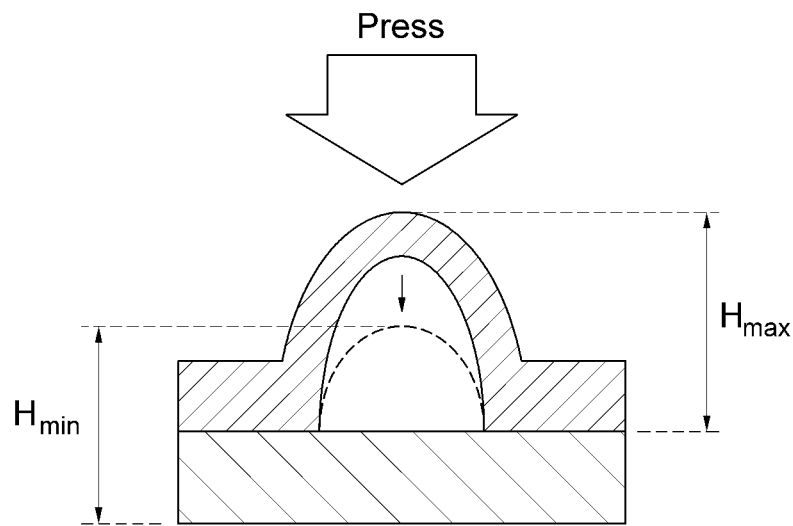
FIG. 2 is a conceptual diagram illustrating a maximum height ($H_{max}$) and a minimum height ($H_{min}$) according to application of a pressure to closed cells provided in a sheet having a closed cell layer according to the present invention.

FIG. 2 conceptually illustrates a maximum height ($H_{max}$) and a minimum height ($H_{min}$) of the closed cells 120a provided in the closed cell layer 120 of the present invention according to the application of pressure.

As illustrated in FIG. 2 below, when a certain pressure is applied to the top of the cell layer 120 having the plurality of closed cells 120a formed on one surface thereof, a height of the closed cells 120a may be lowered. In such a case, the maximum height ($H_{max}$) and the minimum height ($H_{min}$) may vary according to the air density filled in the closed cell 120a, and physical properties of a material forming the closed cell 120a may also affect. In such a case, the method of measuring the maximum height ($H_{max}$) and the minimum height ($H_{min}$) of the closed cell 120a may be in accordance with a conventional method known in the art. For example, after measuring the maximum height ($H_{max}$) of the closed cell before applying a certain pressure under the conditions of 1 atm and 15° C., a certain pressure is gradually applied, and a height immediately before a point in time at which the shape of the closed cell 120a is damaged is measured as the minimum height ($H_{min}$), thereby obtaining a ratio of the minimum height ($H_{min}$) to the maximum height ($H_{max}$). The measuring method thereof is not particularly limited.

Specifically, the height of the closed cell 120a sealed with air may change according to a predetermined pressure applied from the outside. In such a case, the change in height of the closed cell 120a according to the applied pressure is preferably adjusted within a predetermined range in consideration of elasticity retention and shape durability improvement. For example, the ratio of the maximum height ($H_{max}$) and the minimum height ($H_{min}$) of the closed cell 120a may be in a range of 1:0.6 to 0.95, and it may be implemented within the above range according to the shape and pattern of the area of the non-bonded portion 140. When the ratio of the minimum height ($H_{min}$) to the maximum height ($H_{max}$) of the closed cell 120a satisfies the above numerical range, the advantages of maintaining elasticity of the closed cell 120a and improving the shape durability of the sheet may be achieved.

The closed cell 120a according to the present invention provides cushioning of the sheet 100 as a predetermined air is sealed therein, and the external surface may be formed to be curved, so that a cushioning feeling may be visually provided. That is, due to the repetitive alternating arrangement of the bonded portion 130 and the non-bonded portion 140, the closed cell layer 120 in which the plurality of closed cells 120a are formed at regular intervals may be provided, and such a closed cell layer 120 may serve to provide a sheet capable of preventing deformation or damage, while maintaining the shape of the closed cell under external shock or harsh external environmental conditions.

One surface of the cell layer 120, specifically, a surface of the cell layer 120 that is not in contact with the first resin film layer 121 has a predetermined embossed pattern formed by repeatedly arranging the plurality of closed cells 120a. Specifically, the cell layer 120 has a regular embossed pattern formed by alternating the plurality of closed cells 121 formed in the non-bonded portion 140 area and the flat bonded portion 130 area in which the closed cells 121 are not formed. This embossed pattern has a pattern width along a first direction; a pattern length along a second direction crossing the first direction; and a pattern height orthogonal to the first and second directions and along a direction perpendicular to the first resin film layer 121. In such a case, each pattern width, pattern length and/or pattern height of the embossed pattern is not particularly limited and may be appropriately adjusted according to the intended use. For example, the width, length, and/or height of each pattern constituting the embossed pattern may be substantially the same as each other.

A horizontal cross-sectional shape of the embossed pattern is not particularly limited, and may be, for example, a circular shape, a semicircular shape, a fan shape, or a polygonal shape greater than a triangle. In addition, various pattern shapes known in the art may be applied without limitation. A vertical cross-sectional shape of the embossed pattern formed on one surface of the cell layer 120 is not particularly limited, and may be, for example, a cylindrical shape, a hemispherical shape, or a polyhedral shape having at least one surface convexly curved.

A predetermined separation distance is formed between any one of the plurality of closed cells 120a and any one of other closed cells 120a adjacent thereto. The separation distance is not particularly limited, and may be substantially the same as or smaller than any one of the pattern width and the pattern length described above. The height of the cell layer 120 is not particularly limited, and for example, it may be substantially the same as the pattern height of the plurality of closed cells 120a provided on one surface of the cell layer 120.

In the present invention, the total area or number of the plurality of closed cells 120a may be freely adjusted in consideration of the effect of preventing deformation or breakage (e.g., destruction) of the sheet and the effect of maintaining the shape of the closed cells.

Print Portion

The sheet 100 having the closed cell layer according to the present invention includes a print portion 150 formed on at least one surface of the first resin film layer 121 and having a predetermined color or pattern. As the print portion 150 implements various colors, patterns, and/or designs, it may increase readability and exhibit superior identifiability compared to conventional sheets.

The color, pattern, and/or design of the print portion 150 is not particularly limited, and may be appropriately applied according to the intended use or user's needs. For example, the print portion 150 may be in the form of a color containing a common pigment in the art or may be in the form including both predetermined pattern and color.

A position where the print portion 150 is formed is not particularly limited. For example, it may be formed on another surface of the first resin film layer 121, on one surface of the first resin film layer 121 in contact with the cell layer 120, or on both of them. A size/area of the print portion 150 to be formed is not particularly limited and may have substantially the same size/area as that of the first resin film layer 121 or may be smaller than that on a plane. Specifically, the print portion 150 may be formed on at least one surface of the first resin film layer 121, for example, formed over a large area on the entire another surface, or may be partially formed on a partial area.

The print portion 150 may form a predetermined color, pattern, and/or design on the first resin film layer 121 and/or the second resin film layer 122 through direct printing, or a printing layer 160 having a pre-formed color and/or pattern may be separately used and laminated on the first resin film layer 121.

For example, when forming the print portion 150 by directly printing on the first resin film layer 121 and/or the second resin film layer 122, a conventional printing method known in the art may be used. Non-limiting examples of applicable printing methods may include gravure printing, transfer printing, digital printing, offset printing, flexographic printing, screen printing, RISO printing, or rotary screen printing. Specifically, the print portion 150 may be formed on at least one surface of the first resin film layer 121, for example, may be formed over a larger area on the entire another surface, or may be partially formed on a partial area of another surface through the above-described printing method. As such, when a specific image is directly printed on at least one surface of the first resin film layer 121, it may not only have identifiability but also reduce costs by reducing incidental costs required for a separate printing process, thereby improving product competitiveness.

In the present invention, the print portion 150 may be formed by laminating the printing layer 160 having a predetermined color and/or pattern on at least one surface, specifically, another surface, of the first resin film layer 121. In this case, in order to increase an adhesive strength between the first resin film layer 121 and the print portion 150 having a transfer pattern, a conventional adhesive layer known in the art may be further included to enhance the adhesive strength between them. In addition, the print portion 150 may be formed using a printed release layer having a transfer pattern.

A method of manufacturing the sheet 100 having the closed cell layer according to the present invention is not particularly limited, and may be prepared using a conventional sheet manufacturing apparatus known in the art.

For example, the sheet manufacturing apparatus may use a device including a hopper, an extrusion device, and a roller without limitation, where the roller may include at least one of a forming roller, a press roller, a guide roller, and a support roller for producing various shapes. A temperature and pressure during extrusion and/or forming (e.g., molding) are not particularly limited and may be appropriately adjusted within a common range known in the art. For example, the temperature may be higher than a softening point of the resin constituting the film.

Hereinafter, various modified examples of a sheet having a closed cell layer according to an embodiment of the present invention will be described with reference to FIGS. 3 to 10.

FIGS. 3 and 4 are schematic plan views illustrating various embodiments of a bonded portion 130 and a non-bonded portion 140 provided on one surface of a sheet 100 having a closed cell layer according to the present invention.

Referring to FIG. 3, a planar shape of the non-bonded portion 140, specifically, the planar shape of the plurality of closed cells 120a formed in the non-bonded portion 140 area may have a circular pattern. In addition, in FIG. 4, the planar shape of the plurality of closed cells 120a formed in the non-bonded portion 140 area may have a quadrangular pattern.

In the present invention, the planar shape of the non-bonded portion 140 provided on one surface of the sheet 100 having the closed cell layer is illustrated in detail through FIGS. 3 and 4. However, it is not limited thereto, and may be modified to have various shapes and sizes known in the art.

FIGS. 5 to 7 are schematic perspective views illustrating various embodiments of a bonded portion 130 and a non-bonded portion 140 provided on one surface of a sheet 100 having a closed cell layer according to the present invention.

While the planar shapes of the non-bonded portion 140 illustrated in FIGS. 5 and 6 all show a circular pattern, a vertical cross-sectional shape of the non-bonded portion 140, specifically, each embossed pattern of the plurality of closed cells 120a formed in the non-bonded portion 140 area may have a cylindrical or hemispherical shape.

In addition, while the planar shape of the non-bonded portion 140 illustrated in FIG. 7 has a quadrangular pattern shape as in FIG. 4, a vertical cross-sectional shape of the non-bonded portion 140, specifically, each embossed pattern of the plurality of closed cells 120a formed in the non-bonded portion 140 area may have a polygon (e.g., polyhedron) shape having one surface convexly curved.

As described above, in the present invention, by variously modifying the non-bonded portion 140 and the pattern shape of the closed cell 120a formed in the non-bonded portion 140, it may achieve the advantage of being widely applicable depending on the purpose of use of the sheet 100 having the closed cell layer according to the present invention.

The closed cells 120a provided in the sheet 100 according to the present invention may be formed by the regular alternating arrangement of the bonded portion 130 and the non-bonded portion 140, and in such a case, the shape of the closed cells 120a may be substantially the same as or different from the shape of the non-bonded portions 140. Specifically, the bonded portion 140 may mean a pattern, that is, a planar shape, of a bottom surface formed on one surface (e.g., upper portion) of the first resin film layer 121, and as one surface of the first resin film layer 121 and one surface of the second resin film layer 122 are partially bonded to each other to form a sealed portion for the closed cell 120a in an internal space between them 121 and 122, the pattern shape of the closed cell 120a may be different from the planar shape of the non-bonded portion 140.

In the present invention, the cross-sectional shape of the closed cell 120a pattern formed in the non-bonded portion 140 area is illustrated in detail through FIGS. 5 to 7. However, it is not limited thereto, and may be modified to have various shapes and sizes known in the art.

FIGS. 8 to 10 are cross-sectional views illustrating various embodiments of the print portion 150 provided on the sheet 100 having the closed cell layer according to the present invention.

FIG. 8 schematically illustrates another embodiment of a sheet having a closed cell layer according to the present invention.

Compared to FIG. 1 in which the print portion 150 is formed on part of another surface of the first resin film layer 121, referring to FIG. 8, the sheet having the closed cell layer according to another embodiment of the present invention includes both of a first print portion 150 formed on part of another surface of the first resin film layer 121; and a second print portion 150 formed on part of a surface of the cell layer 120 in which the plurality of closed cells are formed.

In particular, in the case of the sheet in which the second print portion 150 is formed on a surface of the cell layer 120 in which the plurality of closed cells are formed, that is, on an upper portion of an outer surface (e.g., another surface) of the second resin film layer 122, a stereoscopic (e.g., three-dimensional) effect may be imparted and an effect of visually enhancing the readability or visibility of a specific printed pattern may be achieved compared to the case in which the print pattern (e.g., first print portion) is formed alone on a planar surface.

In such a case, the method of forming the second print portion 150 on another surface of the second resin film layer 122 is not particularly limited, and may be carried out in the same way as the first print portion 150 is directly printed on the first resin film layer 121 described above. For example, a printing method known in the art such as gravure printing, transfer printing, digital printing, offset printing, flexographic printing, screen printing, RISO printing or rotary screen may be used.

The second print portion 150 may be prepared by laminating (e.g., bonding) the second resin film layer 122 having a predetermined pattern, design, and the like printed on one surface thereof through the above-described printing process with the first resin film layer 121. Alternatively, the unprinted first resin film layer 121 and the second resin film layer 122 may be disposed to face each other, laminated and bonded, and then direct printing is carried out on part of the non-bonded portion 140, that is, another surface (e.g., upper portion of the outer surface) of the second resin film layer 122, to form the second print portion 150. Considering the shape stability and durability of the closed cell 120a, it is preferable to form the second print portion 150 by the former method.

FIG. 9 schematically illustrates another embodiment of a sheet having a closed cell layer according to the present invention.

Compared to FIG. 1 in which the print portion 150 is formed on part of another surface of the first resin film layer 121, in describing another embodiment of the print portion 150 according to FIG. 9, the print portion 150 may be provided on one surface of the first resin film layer 121 in contact with the closed cell layer 120, that is, one surface (upper portion of the inner surface) of the first resin film layer 121 that is bonded with the second resin film layer 122. In this case, the print portion 150 may be formed over a large area on the entire one surface of the first resin film layer 121 or partially formed on a partial area.

As described above, when the print portion 150 is formed on the inner surface of the first resin film layer 121, that is, on an upper portion of the surface in contact with the second resin film layer 122, the print portion 150 may be protected from external shock or harsh conditions, and the holding strength of the print portion 150 and product competitiveness may be improved. In addition, a part of the print film interposed between the first resin film layer 121 and the second resin film layer 122 may be stacked in a predetermined arrangement to obtain an effect of showing a desired pattern or image.

The print film refers to a film on which a predetermined color, image, and/or pattern is printed by the above-described printing method. Such a print film may use a plastic film commonly known in the art without limitation, and specifically, it is preferable to use a biodegradable polymer substantially the same as or different from the material constituting the first resin film layer 121 described above.

For example, the print film may include at least one selected from starch, cellulose, chitin, PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate) and combinations thereof. In a preferred embodiment, the print film is made of a mixture of PLA (polylactide) and PBAT (polybutylene adipate terephthalate), thereby having advantageous of improved durability and thermal mechanical properties, while maintaining biodegradability of the sheet.

FIG. 10 schematically illustrates another embodiment of a sheet having a closed cell layer according to the present invention.

Referring to another embodiment of the print portion 150 according to the present invention with reference to FIG. 10, the print portion 150 may be formed by stacking (e.g., laminating) a printing layer printed with a specific image on another surface of the first resin film layer 121.

The print portion 150 may be formed on another surface of the first resin film layer 121 through a direct printing method or may be formed by laminating a separate printing layer 160. In this case, when the print portion 150 is formed by stacking the printing layer 160 printed with a specific image on another surface of the first resin film layer 121, a predetermined image may be separately printed on the printing layer 160, such that the refinement and resolution of the image may be increased. In addition, as the printing layer 160 is additionally stacked, it has the advantage of preventing sheet damage from external shock or harsh external environments and further improving durability.

The printing layer 160 is not particularly limited, and refers to, for example, a film or sheet printed with a specific image. Such a printing layer 160 may use a plastic film or sheet commonly known in the art without limitation, and specifically, it is preferable to use a biodegradable polymer substantially the same as or different from the material constituting the first resin film layer 121 described above.

For example, the printing layer 160 may include at least one selected from starch, cellulose, chitin, PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate) and combinations thereof. For a preferred example, the printing layer 160 is made of a mixture of PLA (polylactide) and PBAT (polybutylene adipate terephthalate), thereby having advantageous of improved durability and thermal mechanical properties, while maintaining biodegradability of the sheet. The above-described sheet having the closed cell layer and a modified example of the present invention include the plurality of closed cells formed on an eco-friendly resin film and sealed with a predetermined air, and the print portion printed with a predetermined image, such that it is possible to prevent deformation or breakage caused by external shock or under harsh environmental conditions, and significantly improve the shape retention of the closed cells, the elasticity retention of the closed cells, and the shape durability of the sheet. Furthermore, high readability, identifiability, and eco-friendliness may be secured. The sheet having the closed cell layer according to the present invention may be applied without limitation to all technical fields in which the sheet is used in the corresponding art.

Example 1

In this example, a conventional sheet manufacturing apparatus including a hopper, an extrusion device, and at least one roller was used, and in such a case, a forming roller having a semicircular shape was applied as a roller for forming a closed cell layer.

Specifically, as a biodegradable resin constituting a first resin film layer and a second resin film layer, 90 percent by weight (wt %) of PBAT and 9 wt % of PLA were used, and a mixture of 0.5 wt % of a lubricant (Montan wax), 0.3 wt % of a primary antioxidant (phenol-based), and 0.2 wt % of a secondary antioxidant (phosphite-based) was used as additives to prepare a biodegradable resin raw material. The prepared biodegradable resin raw material was input to a hopper of the sheet manufacturing apparatus, and then a first resin film and a second resin film were each extruded by a T die. The extruded second resin film was pressed on a forming roller having a closed semicircular shape as illustrated in FIG. 3, and the first resin film was pressed on a flat roller without a shape. Thereafter, one surface of the second resin film and one surface of the first resin film were laminated to face each other, and then bonded to form a closed cell layer on the first resin film. In such a case, the forming roller was adjusted to a semicircle with a diameter of 7 mm and a height of 3.5 mm to form a closed cell layer. Then, the film formed with the closed cell layer was cooled and wound in a roll form through a transfer roller, thereby manufacturing a sheet having a closed cell layer. Then, an arbitrary shape was printed on an upper surface of the first resin film layer and a lower surface of the second resin film layer of the sheet having the closed cell layer by a digital printing method, thereby forming a print portion.

The sheet having the closed cell layer of Example 1 prepared as described above had a biodegradability of 98% measured according to KS M ISO 14855-1 standard.

Example 2

A sheet having a closed cell layer of Example 2 was prepared in the same manner as in Example 1, except that a forming roller having a closed quadrangular columnar shape as illustrated in FIG. 4 was applied instead of a forming roller in a closed semicircle shape, and that a shape of the quadrangular column was adjusted to 5 mm×10 mm with a height of 3.0 mm.

The sheet having the closed cell layer of Example 2 prepared as described above had a biodegradability of 98% measured according to KS M ISO 14855-1 standard.

Comparative Example 1

A sheet of Comparative Example 1 was prepared in the same manner as in Example 1, except that the sheet was pressed on a flat roller instead of a forming roller having a predetermined shape.

The sheet according to Comparative Example 1 was substantially the same as a general film in which double-layered resin layers were bonded, and thus a closed cell layer was not formed. Accordingly, it was appreciated that deformation or breakage could not be prevented under external shock or harsh external environmental conditions.

Comparative Example 2

It was implemented as in Example 1, except that a closed cell layer was formed with a forming roller adjusted to a diameter of the semicircle of 3 mm and a height of 1.5 mm.

Comparative Example 3

It was implemented as in Example 1, except that a closed cell layer was formed with a forming roller adjusted to a diameter of the semicircle of 15 mm and a height of 10 mm.

Evaluation Example 1

Using the sheets having the closed cell layer prepared in Examples 1 and 2 and Comparative Example 1, an air density inside the closed cells, a resultant height ratio, and an external shock absorption were measured for evaluation as follows.

(1) Gas Density Measurement

After randomly selecting one of the air-sealed closed cells and cutting it while maintaining the shape of the cell, a weight (b) of the cut cell sample was measured. Then, an air inside the cell sample was removed, and a weight (a) and a volume (V) of the air-removed cell sample were measured to calculate a density of air as shown in Equation 1 below.

Density of air($d$)=mass of air/volume of air=$b-a/V$  [Equation 1]

(2) Measurement of Ratio of Minimum Height ($H_{min}$) to Maximum Height ($H_{max}$) of Closed Cell The maximum height ($H_{max}$) and the minimum height ($H_{min}$) of the closed cell 120a were each measured according to the measurement method with reference to FIG. 2 described above, and then expressed as a ratio thereof. In such a case, the maximum height ($H_{max}$) was set as an initial height of the closed cell under the conditions of 1 atm and 15° C. without applying pressure, and the minimum height ($H_{min}$) was set to a height immediately before the cell shape was damaged while gradually applying a certain pressure to the closed cell under the same conditions. In addition, a pressure when the closed cell was damaged was defined as a burst pressure.

(3) Evaluation of External Shock Absorption

After putting a single sheet prepared according to Examples 1 to 2 and Comparative Examples 1 to 2 on a 2 mm thick glass plate having an A4 paper size, an iron ball weighing 5 kg was dropped to the glass plate from a height of 60 cm 5 times, and the degree of breakage (e.g., destruction, crack, etc.) on the glass plate was evaluated according to the following criteria.

Excellent: there is no damages on the glass plate
Good: the number of damages on the glass plate is 1 to 2 times
Defect: the number of damages on the glass plate is 3 to 5 times

TABLE 1

|  | Ex. 1 | Ex. 2 | Comp. Ex. 1 | Comp. Ex. 2 | Comp. Ex. 3 |
| --- | --- | --- | --- | --- | --- |
| Air density (g/cm³) | 0.09 | 0.1 | Measurement impossible | Less than 0.001 | 0.89 |
| $H_{max}$:$H_{min}$ | 1:0.77 | 1:0.88 | Measurement impossible | 1:0.2 | 1:1 |
| Burst pressure (atm) | 1.3 | 1.5 | Measurement impossible | 0.6 | 0.2 |
| External shock absorption | Excellent | Excellent | Defect | Defect | Defect |

Evaluation Example 2

Specimens were prepared using film fabrics (45 μm thick, 2 layers) prepared from biodegradable resin raw materials according to Examples 1 and 2. Physical properties were measured according to the ASTM D 412 method using each specimen, and the results are shown in Table 2 below.

TABLE 2

| Category | Load at Max. Load (kgf) | Displacment at Max. Load (mm) | Stress at Max. Load (kgf/cm²) | % Strain at Max. Load (%) | Stress at 100% (kgf/cm²) | Stress at 300% (kgf/cm²) |
| --- | --- | --- | --- | --- | --- | --- |
| Ex. 1 | 1.1 | 69 | 269 | 347 | 157 | 240 |
| Ex. 2 | 1.0 | 70 | 273 | 351 | 160 | 242 |

As shown in Tables 1 and 2, the sheets having the closed cell layer prepared in Examples 1 and 2 may prevent deformation or breakage under external shock or harsh external environmental conditions, and accordingly, it may be expected that the elasticity and durability of the sheet and the shape retention of the closed cell may be continuously maintained, identifiability may be achieved by printing a specific image, and eco-friendliness may be also acquired.

However, in Comparative Example 1, the closed cell layer was not formed, so the effect of preventing external shock was not exhibited, and in Comparative Examples 2 and 3, the closed cell was destroyed at a lower level of burst pressure than in Examples 1 and 2, and accordingly, it was appreciated that durability was lowered compared to Examples 1 and 2, and there was a problem in protection against external shock.

In the above, the present invention has been illustrated and described with specific preferred embodiments, but the present invention is not limited to the above-described embodiments and various changes and modifications are possible without departing from the technical spirit of the present invention.

The invention claimed is:

1. A sheet having a closed cell layer, the sheet comprising:
    a first resin film layer;
    a cell layer formed on one surface of the first resin film layer and comprising a plurality of closed cells spaced apart from each other at predetermined intervals; and
    a print portion formed on at least one surface of the first resin film layer and having a predetermined color or pattern,
    wherein the closed cells are filled with a predetermined amount of air,
    a ratio of a maximum height ($H_{max}$) and a minimum height ($H_{min}$) of the closed cells filled with air is in a range of 1:0.77 to 0.95,
    wherein an internal air density of the closed cells is in a range of 0.09 to 0.5 g/cm$^3$,
    wherein both the first resin film layer and the cell layer comprise a mixture of a biodegradable polymer,
    wherein the mixture comprises polylactide (PLA) and polybutylene adipate terephthalate (PBAT), the content of PBAT is greater than the content of PLA, and
    wherein the sheet having a closed cell layer has a biodegradability of 80% or more as measured according to KS M ISO 14855-1.

2. The sheet having the closed cell layer of claim 1, wherein a glass plate disposed beneath the sheet does not crack when an iron ball weighing 5 kg freely falls from a height of 60 cm on the sheet having the closed cell layer disposed on a glass plate.

3. The sheet having the closed cell layer of claim 1, wherein the biodegradable polymer further comprises at least one or more selected from starch, cellulose, chitin, PHA (polyhydroxyalkanoates), PCL (poly ε-caprolactone), PGA (polyglycolacid), AP (aliphaticpolyester), PHBV (poly (3-hydroxybutyrate-co-3-hydroxy valerate)), and PBS (polybutylene succinate).

4. The sheet having the closed cell layer of claim 1, wherein the cell layer comprises:
    a bonded portion in which one surface of a second resin film layer is laminated and fused on one surface of the first resin film layer; and
    a non-bonded portion in which the first resin film layer and the second resin film layer are not fused and air-sealed closed cells are formed between the first resin film layer and the second resin film layer.

5. The sheet having the closed cell layer of claim 1, wherein the cell layer comprises a predetermined embossed pattern formed by repeatedly arranging the plurality of closed cells.

6. The sheet having the closed cell layer of claim 5, wherein a horizontal cross-sectional shape of the embossed pattern is selected from a circular shape, a semicircular shape, a fan shape, and a polygonal shape.

7. The sheet having the closed cell layer of claim 1, wherein the print portion is formed:
    on another surface of the first resin film layer,
    on one surface of the first resin film layer in contact with the cell layer, or
    on both of the another surface and one surface of the first resin film layer.

8. The sheet having the closed cell layer of claim 1, wherein the print portion is formed by stacking a printing layer printed with a predetermined color or pattern on another surface of the first resin film layer.

9. The sheet having the closed cell layer of claim 8, wherein the print portion comprises at least one or more biodegradable polymers selected from starch, cellulose, chitin, PLA (polylactide), PHA (polyhydroxyalkanoates), PCL (poly ε-caprolactone), PBAT (polybutylene adipate terephthalate), PGA (polyglycolacid), AP (aliphaticpolyester), PHBV (poly(3-hydroxybutyrate-co-3-hydroxy valerate)), PBS (polybutylene succinate) and combinations thereof.

* * * * *